United States Patent Office 2,753,663
Patented July 10, 1956

2,753,663
PRODUCTION OF HYBRID SEED CORN

Donald F. Jones, Hamden, Conn., assignor to Research Corporation, New York, N. Y., a corporation of New York No Drawing. Application April 10, 1950,
Serial No. 155,131

5 Claims. (Cl. 47—58)

This invention relates to a novel method for the production of hybrid seed corn.

In application Serial No. 47,912 filed September 4, 1948, by Donald F. Jones and Paul C. Mangelsdorf, there is described a method for the production of hybrid seed corn without detasseling in a crossing field by incorporating in the seed parent a condition of cytoplasmic pollen sterility. The sterile parental inbred strain is propagated by continual backcrossing, using pollen from an inbred strain of the same genetic constitution differing from the sterile inbred strain only in lacking the character of cytoplasmic pollen sterility. This pollen sterile inbred strain is then combined with any desired inbred strain to produce either a commercial single cross hybrid as in sweet corn, or a single cross hybrid which is used by the seed producer as a seed parent to produce commercial hybrid seed as in double crossed or three-way field corn. The pollen sterile inbred or single cross that is used as the seed parent in a seed production crossing field by the commercial seed producer is planted in alternating rows with another inbred or single cross to supply the pollen for the final cross.

Since cytoplasmic sterility, unlike genic sterility, does not segregate in the cross, all of the offspring of the cross are pollen sterile, so that the hybrid seed produced by the cross would be pollen sterile and therefore functionally seed sterile and useless to the farmer for crop production. The prior application describes a method of overcoming this difficulty by mixing with the seed from the sterile cross, seed from a normal cross of the same genic constitution in the proper proportion to restore seed fertility in the farmer's field. This production of normal fertile hybrid seed for admixture with seed from the sterile cross requires the usual detasseling of the seed parent plants in the field.

It has now been found that the mixing of seed as described in the prior application may in some instances be avoided and the operation of detasseling can under some conditions be entirely eliminated in the growing of the hybrid seed corn, by the utilization of genetic factors capable of restoring pollen fertility to the progeny of cytoplasmic pollen sterile strains.

In the process of establishing completely pollen sterile inbreds and single crosses it was found that many individual plants of different varieties had the ability to restore pollen production partially. These plants had to be eliminated by selection of individual plants in the fertile inbred lines used for propagating the sterile inbreds and also in the fertile inbreds used in producing the sterile single crosses. This selection is made by self-fertilizing individual plants and using the pollen from these plants in a test cross on sterile plants. If the progeny resulting from the test cross is completely sterile, the fertile progeny of this particular self-fertilized plant is then used for further propagation and crossing.

This same method of selection is used to produce inbred lines that have the ability to restore pollen production. It has been found that a very few plants in a small number of varieties of corn have the ability to restore pollen production completely. This ability to restore pollen production appears to be determined by single Mendelizing genes in the chromosomes.

This gene which has the ability to restore pollen fertility in cytoplasmically sterile plants can be transferred and incorporated into any desired inbred strain and such inbred strains can be used as the pollen parent of any commercial hybrid in field corn, sweet corn or pop corn.

The following inbred strains have been found thus far to be among those including a gene having the ability to restore pollen production: Minnesota 71, Wisconsin 9, Illinois Hy, Kentucky 21 and Texas 172C.

It will therefore be seen that the invention provides a method of producing hybrid seed corn whereby the necessity for hand-detasseling in the growing of the hybrid corn is entirely eliminated, which comprises growing a male-fertile corn of selected genetic composition, including a genic factor capable of restoring pollen fertility to cytoplasmic male-sterile corn, in pollinating proximity to a cytoplasmic male-sterile corn of selected genetic composition and separately harvesting the seed from said male-sterile corn.

The male-fertile corn may be the product of repeated back-crossing of a male-fertile corn of selected genetic composition on a hybrid of said male-fertile corn and a strain of corn including a genic factor capable of restoring pollen fertility to cytoplasmic male-sterile corn, or it may be the product of repeated back-crossing of a male-fertile corn of selected genetic composition on the progeny of said male-fertile corn with a strain of corn including a genic factor capable of restoring pollen fertility to cytoplasmic male-sterile corn which retain said genic factor.

I claim:

1. A method of producing hybrid seed corn which comprises growing male-fertile corn plants not more than one generation removed from at least one inbred strain capable of restoring pollen fertility to cytoplasmic male-sterile corn in pollinating proximity to cytoplasmic male-sterile plants not more than one generation removed from a cytoplasmic male-sterile inbred strain and separately harvesting the corn from said male-sterile plants as seed corn.

2. A method as defined in claim 1 wherein the male-fertile corn is the product of repeated back-crossing of a male-fertile corn of selected genetic composition on a hybrid of said male-fertile corn and a strain of corn including a genic factor capable of restoring pollen fertility to cytoplasmic male-sterile corn.

3. A method as defined in claim 1 wherein the male-fertile corn is the product of repteated back-crossing of a male-fertile corn of selected genetic composition on the progeny of said male-fertile corn with a strain of corn including a genic factor capable of restoring pollen fertility to cytoplasmic male-sterile corn which retain said genic factor.

4. A method as defined in claim 1 wherein the male-sterile corn is a hybrid of a cytoplasmic male-sterile strain and a male-fertile strain.

5. A method as defined in claim 1 wherein the male-sterile corn is a hybrid of a cytoplasmic male-sterile inbred strain and a male-fertile inbred strain.

References Cited in the file of this patent

Rhoades: Science, vol. 73, No. 1891, pp. 340–341 (March 27, 1931).

Rhoades: J. Genetics, vol. 27, No. 1, pp. 71–93 (March 1933).

Josephson: J. Am. Soc. Agronomy, vol. 40, No. 3, pp. 267–274 (Mar. 1948).

Brown: "Pioneer Hi-Bred . . ." published March 10, 1949, in Maize Genetics Co-operation News Letter 23, pp. 38–39.

Jenkins: Rpt. 8th So. Corn Improvement Conference, mimeographed Jan. 1950 at Plant Industry Sta., Beltsville, Md., pp. 12–14.

Jenkins: Rpt. 9th So. Corn Improvement Conference, mimeographed Dec. 1950 at Plant Industry Sta., Beltsville, Md.; pp. 23–25.